United States Patent
Choiniere et al.

(10) Patent No.: US 10,466,581 B1
(45) Date of Patent: Nov. 5, 2019

(54) DUAL FIELD OF VIEW OPTICS

(71) Applicant: BAE Systems Information and Electronic Systems Integration Inc., Nashua, NH (US)

(72) Inventors: Michael J. Choiniere, Merrimack, NH (US); James A. Sterritt, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 63 days.

(21) Appl. No.: 15/776,290

(22) PCT Filed: Oct. 31, 2017

(86) PCT No.: PCT/US2017/059251
§ 371 (c)(1),
(2) Date: May 15, 2018

(87) PCT Pub. No.: WO2019/088997
PCT Pub. Date: May 9, 2019

(51) Int. Cl.
*G03B 35/10* (2006.01)
*G02B 23/12* (2006.01)
*H04N 13/239* (2018.01)
*G02B 27/22* (2018.01)

(52) U.S. Cl.
CPC ............. *G03B 35/10* (2013.01); *G02B 23/12* (2013.01); *G02B 27/2235* (2013.01); *H04N 13/239* (2018.05)

(58) Field of Classification Search
CPC ...... G02B 23/12; G02B 23/18; G02B 23/125; G02B 27/2235; H04N 13/10; H04N 13/139; H04N 13/161; H04N 13/239; H04N 13/344; H04N 13/356; H04N 19/597; H04N 21/2365; G03B 35/10
USPC ................................ 359/407, 462, 480, 630
See application file for complete search history.

(56) References Cited

U.S. PATENT DOCUMENTS

| | | | |
|---|---|---|---|
| 5,561,557 A | 10/1996 | Le Bris et al. | |
| 5,963,369 A | 10/1999 | Steinthal et al. | |
| 10,109,104 B2 * | 10/2018 | Newman | G01S 17/87 |
| 10,257,505 B2 * | 4/2019 | Scavezze | G06T 7/30 |
| 2012/0092335 A1 | 4/2012 | Kim et al. | |
| 2014/0253695 A1 | 9/2014 | Kassouf | |
| 2015/0338633 A1 | 11/2015 | Li et al. | |

OTHER PUBLICATIONS

International Search Report, PCT/US17/58251, dated Feb. 1, 2018, 8 pages.

* cited by examiner

*Primary Examiner* — Collin X Beatty
(74) *Attorney, Agent, or Firm* — Davis & Bujold, PLLC; Scott J. Asmus

(57) ABSTRACT

Improved binocular vision system having a high resolution, uncompressed image in the forward facing direction and compressed images on the left and right side periphery. The binocular vision system utilizes a shared sensor between multiple optics to reduce the cost and weight of the device. The system maps multiple optics to portions of sensor arrays such that the compression on the periphery is in the azimuth only and thus more closely matches human vision.

14 Claims, 5 Drawing Sheets

DUAL FIELD OF VIEW OPTICS

FIELD OF THE DISCLOSURE

The present disclosure relates to optical devices, and more particularly to wearable optical devices with compressed periphery vision and uncompressed vision in front of a user.

BACKGROUND OF THE DISCLOSURE

Conveying imagery to pilots and ground vehicle drivers has always been a balance between the need for high visual acuity in the operator's frontal view versus the operator's peripheral view needing to only indicate objects in motion. For example, a pilot needs to be able to maintain contact with their wingman's location without looking in that specific direction. This demonstrates the need for peripheral view. The peripheral view tends to be minimized in the industry to maximum forward visual acuity, particularly given the limitations of sensor arrays, displays and optics, and the overall weight of these optical systems. Wherefore it is an object of this disclosure to overcome the failings of conventional binocular type systems.

SUMMARY OF THE DISCLOSURE

One aspect of the present disclosure is a binocular vision system comprising a first optical component and a second optical component; a first sensor comprising a pixel array having at least two portions, where a first portion of the first sensor array is mapped to the first optical component that is configured to focus radiation from a scene for a peripheral view and a second portion of the first sensor array is mapped to the second optical component that is configured to focus radiation from the scene for a forward looking direction, such that the first portion and the second portion of the first sensor array are separated by a buffer portion; a third optical component and a fourth optical component; a second sensor comprising a pixel array having at least two portions, where a first portion of the second sensor array is mapped to the third optical component that is configured to focus radiation from the scene for a forward looking direction and a second portion of the second sensor array is mapped to the fourth optical component that is configured to focus radiation from the scene for a peripheral view, such that the first portion and the second portion of the second sensor array are separated by a buffer portion; and a processor configured to portion the first and second sensor arrays, process the radiation detected by the first and second sensor arrays, and form an image displayed on a display such that the periphery of the image results from the first and fourth optical components and a forward looking binocular view results from the second and third optical components.

One embodiment of the binocular vision system is wherein the first and the fourth optical components produce horizontal compression. In some cases, the compression is about 3:1 in the azimuth direction. In certain embodiments, the compression is about 4:1 in the azimuth direction.

Another embodiment of the binocular vision system is wherein a total field of view of the image is about 110 degrees. In some cases, the sensor array is about 1600 pixels wide and the periphery portion is about 450 pixels wide, the forward looking portion is about 1100 pixels wide and the buffer portion is about 50 pixels wide.

Yet another embodiment of the binocular vision system is wherein the radiation is selected form the group consisting of visible, near infrared, short-wave infrared, mid-wave infrared, and long-wave infrared.

Another aspect of the present disclosure is a method of providing binocular vision comprising, receiving, via a plurality of optical components, radiation from a scene; focusing, via the plurality of optical components, the radiation from the scene onto a plurality of pixel arrays; portioning the plurality of pixel arrays to create a forward looking portion, a periphery portion, and a buffer portion located between the forward looking portion and the periphery portion on each of the plurality of pixel arrays; mapping, via a processor, a first optical component of the plurality of optical components to the periphery portion of a first pixel array of the plurality of pixel arrays; mapping, via a processor, a second optical component of the plurality of optical components to the forward looking portion of the first pixel array of the plurality of pixel arrays; mapping, via a processor, a third optical component of the plurality of optical components to the forward looking portion of a second pixel array of the plurality of pixel arrays; mapping, via a processor, a fourth optical component of the plurality of optical components to the periphery portion of the second pixel array of the plurality of pixel arrays; detecting, via the plurality of pixel arrays, the radiation focused from the scene via the plurality of optical components; combining without compression in the azimuth direction, via the processor, the radiation detected at the second and third optical components to form a binocular image stream; compressing in the azimuth direction, via the processor, the radiation detected at the first and fourth optical components to form peripheral image streams; combining, via the processor, the radiation detected via the plurality of pixel arrays to provide a data output stream comprising the binocular image stream and the peripheral image streams; and displaying an image on one or more displays, wherein the image comprises the data output stream.

One embodiment of the method of providing binocular vision is wherein the first and the fourth optical components produce horizontal compression. In some cases, the compression is about 3:1 in the azimuth direction. In other cases, the compression is about 4:1 in the azimuth direction.

Another embodiment of the method of providing binocular vision is wherein a total field of view of the image is about 110 degrees. In certain embodiments of the method of providing binocular vision, the sensor array is about 1600 pixels wide and the periphery portion is about 450 pixels wide, the forward looking portion is about 1100 pixels wide and the buffer portion is about 50 pixels wide.

Yet another embodiment of the method of providing binocular vision is wherein the radiation is selected form the group consisting of visible, near infrared, short-wave infrared, mid-wave infrared, and long-wave infrared.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Typical goggle applications use two separate sensors with two separate optical components and then the images are digitally fused to form an image for the user. In contrast, the system of the present disclosure utilizes a single sensor, which is shared between two or more optical components, thus reducing the electronics cost by about 2×. This approach also allows compressed periphery vision with full uncompressed vision in front of the user. The horizontal compression allows for normal processing of motion at the periphery vision. As used herein, goggles encompasses various forms of glasses, shields, and displays, including heads up displays (HUD) and helmet mounted displays (HMD).

Human beings generally have a forward-facing field of view of about 80 degrees as well as some additional field of view at the periphery. Humans have a high visual acuity in the forward direction, but much lower visual acuity on the periphery. Peripheral vision operates largely on motion detection. In one embodiment of the present disclosure, the goggles provide as much detail as can be digested naturally by human vision without wasting computing power or cost on providing details that would not be perceived on the periphery.

In one embodiment, there is one frame of data, but the instantaneous field of view (iFOV) can be varied over the frame to expand or compress the resolution in the scene based on the needs of the user for a particular application. The iFOV is a measure of the spatial resolution of a remote sensing imaging system. IFOV is defined as the angle a single detector element on the axis of the optical system is sensitive to radiation. The iFOV and the distance from a target determine the spatial resolution of the system such that a low altitude imager will have a higher spatial resolution than a higher altitude imager with the same iFOV.

Figure 1:
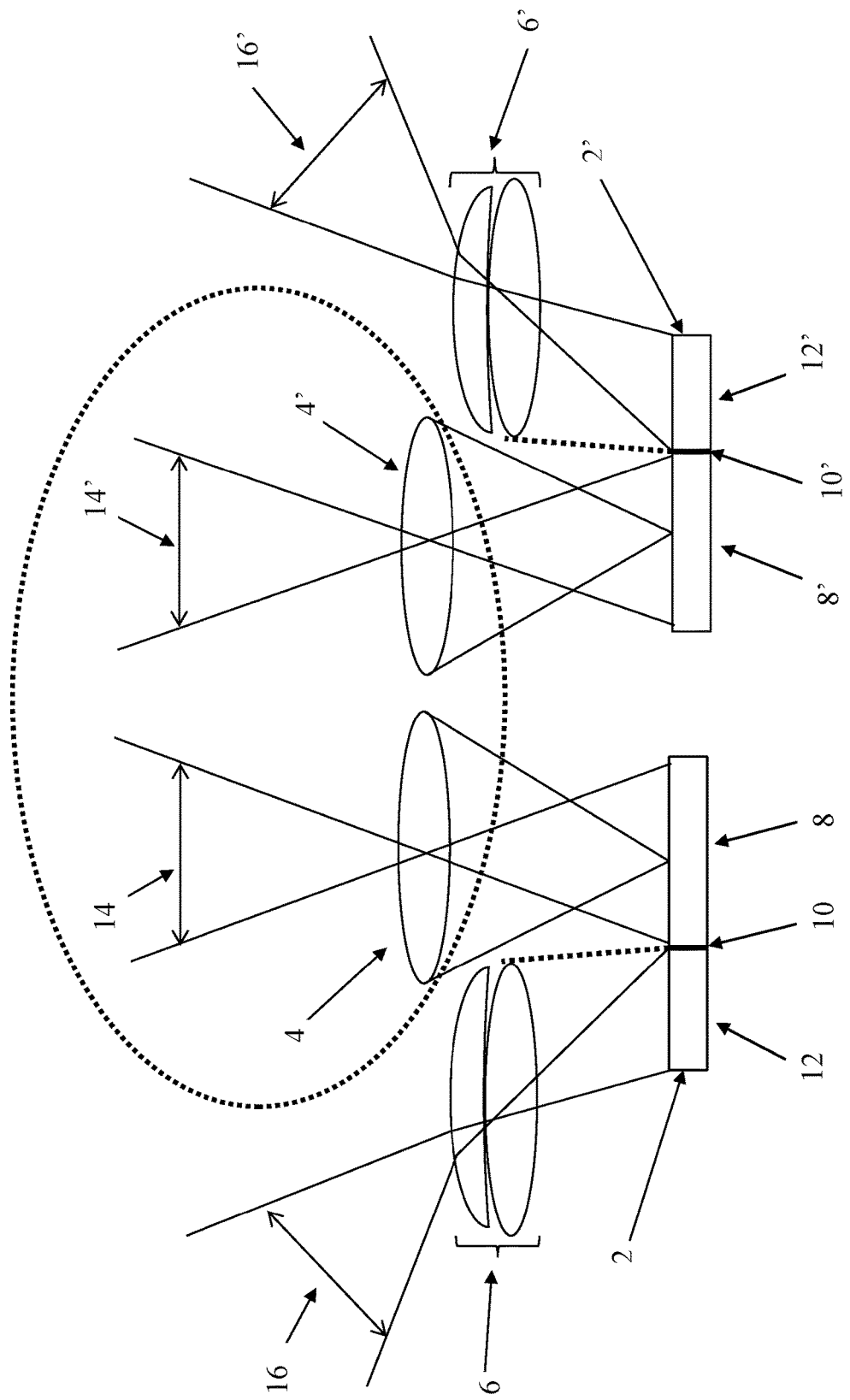
FIG. 1 shows a diagrammatic view of one embodiment of the system of the present disclosure.

Referring to FIG. 1, a diagrammatic view of one embodiment of the system of the present disclosure is shown. More specifically, a plurality of optical components is mapped to a plurality of sensors such that at least two optical components are mapped to separate portions of a sensor. In one embodiment, a sensor 2, 2' is used with a first optical component 4, 4' and a second optical component 6, 6'. In one example, the first optical components 4, 4' each have a FOV of about 25° 14, 14', and the second optical components 6, 6' each have a FOV of about 32° 16, 16'. In certain embodiments, the first optical components 4, 4' have an iFOV of about 0.40 mrads with binocular high resolution. In certain embodiments of the present disclosure the second optical components 6, 6' have an iFOV of 1.2 mrads with a compression of one third of the resolution in the azimuth direction. While the optical properties of the first optical components 4, 4' are shown as being approximately the same, the properties may be different. Likewise, the optical properties of the second optical components 6, 6' are shown as being approximately the same, however the properties may also be different In one embodiment, the system provides a larger FOV for a given sensor size by sharing the sensor between two objectives. In one portion of the sensor, there is no scene compression and in the other portion of the sensor there is 3:1 azimuth compression. As high-definition (HD) sensors have become available, the ability to partition them into separate detection areas using multiple objectives has arisen.

Still referring to FIG. 1, a first portion of a sensor 8, 8' corresponds to the first objectives 4, 4' and in this example has a larger FOV. There, the sensor 4, 4' has no or minimal scene compression. A second portion of a sensor 12, 12' corresponds to the second objectives and has a 3:1 azimuth compression with a smaller FOV. There is a buffer between the mapped lens sections 10, 10' with a compartment baffle. In some cases, where the array is 1600 pixels wide, the first portion 8, 8' is about 1087 pixels wide, the second portion 12, 12' is about 463 pixels wide, and the buffer is about 50 pixels wide.

Figure 2:
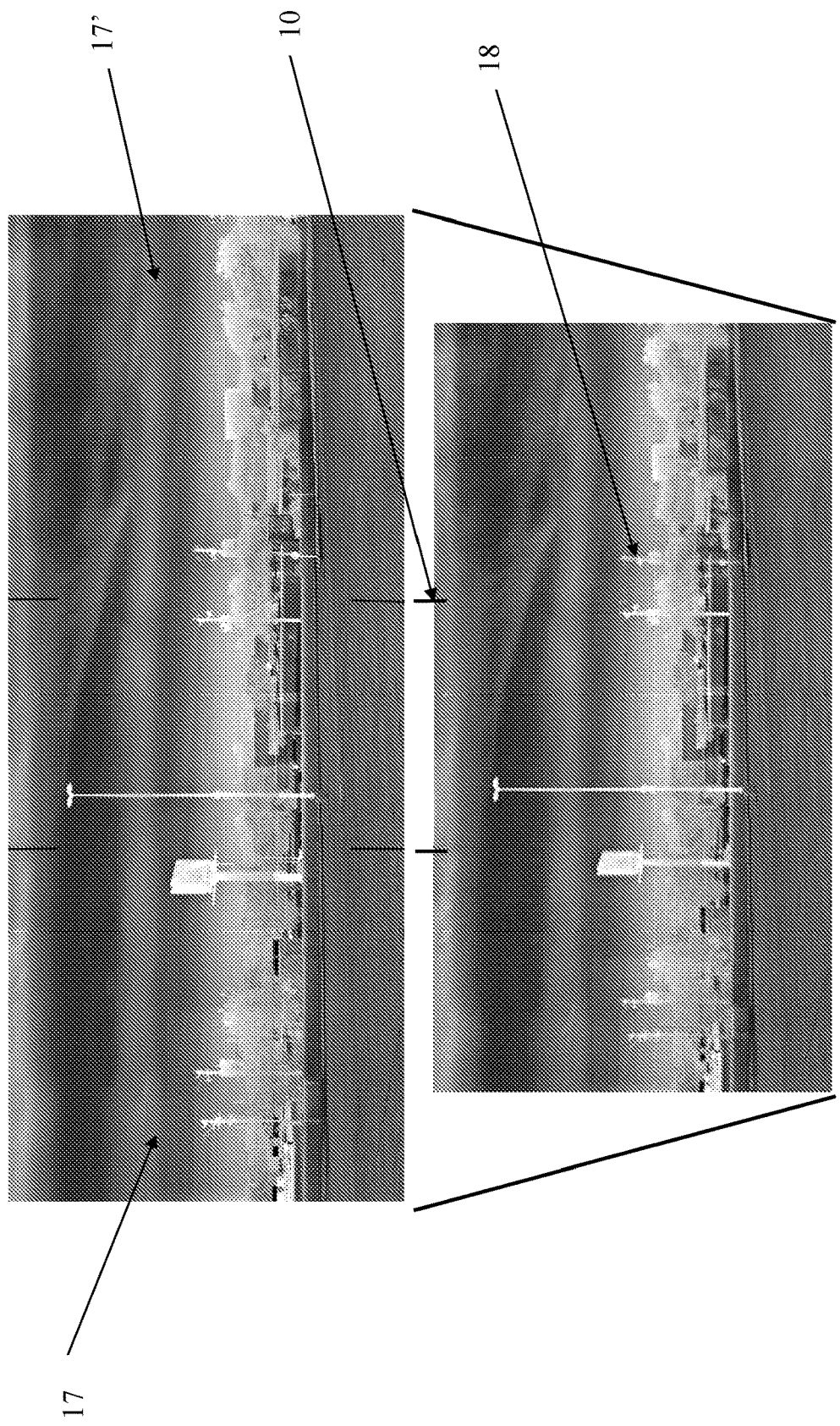
FIG. 2 represents an exemplary view from one embodiment of the system of the present disclosure.

Referring to FIG. 2, an exemplary view from one embodiment of the system of the present disclosure is shown. More particularly, the top of the figure represents uncompressed periphery, while the bottom figure represents a 3:1 azimuth compression along the periphery 17, 17', or left and right sides, of the image. For a user, the scene may have some distortion, but the items in the scene (e.g., telephone poles 18) are still recognizable and clear. The use of a modified goggle provides for a visual image more inline with human vision limits and reduces the components needs in the unit which saves cost and weight and the like.

Figure 3:
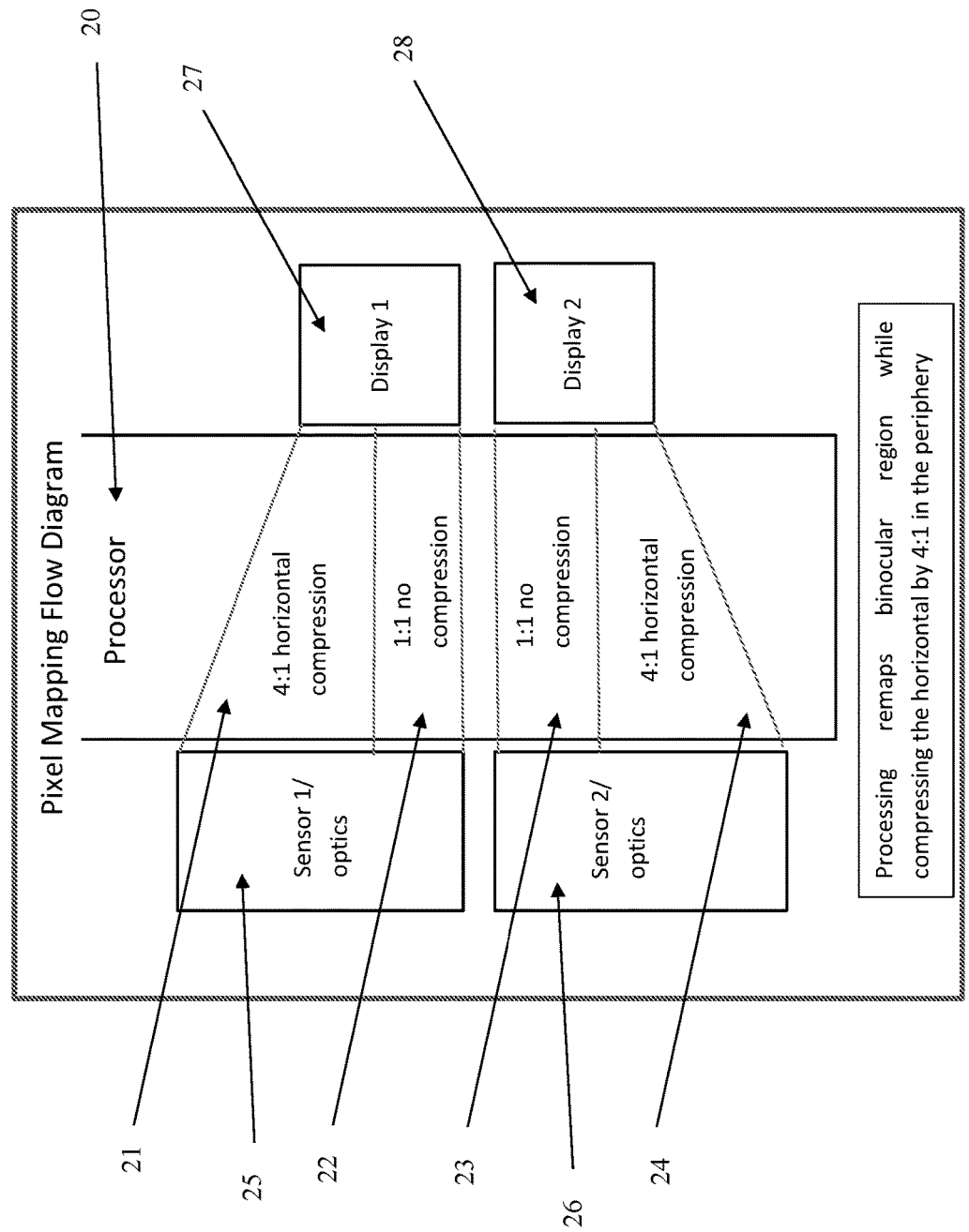
FIG. 3 shows a diagrammatic view of pixel mapping according to the principles of the present disclosure.

This approach can be applied to any vision system where the display or eyepiece has a limited overall FOV of about 30° to 60°. In some cases, the imagery can be collected in visible, near infrared (NIR), short-wave infrared (SWIR), mid-wave infrared (MWIR) or long-wave infrared (LWIR). In certain embodiments, the imagery can be collected by two sensors as shown in FIG. 3, or can be collected by a number of sensors/optics. In certain cases, the horizontal compression on the viewer's or operator's periphery is designed to maintain the visual queuing aspects of the operator's vision. In other words, so long as there is motion in the context of the scene, then the peripheral imagery is of sufficient quality for a left or right glance in that direct direction (without moving the head). Thus, the operator can detect threats or anomalies requiring further attention. In certain embodiments, the compression of the imagery collected by the two or more sensor/optics sets can be mapped to the operator's vision system.

Referring to FIG. 3, a diagrammatic view of pixel mapping according to the principles of the present disclosure is shown. More specifically, the system utilizes a processor 20 that uses a portion of each of the sensors' imagery to generate a binocular forward looking viewer (22, 23). In some cases, the system applies horizontal compression to the imagery in the periphery (21, 24). The sum total of the actual viewer's FOV of the scene versus the limited FOV of the viewer's eyepiece can be managed by this process.

In certain embodiments, two large area HD sensors 25, 26 that are portioned to provide both a binocular forward looking, high acuity region for a pilot or driver and a horizontal compressed, 2:2 to 4:1 imagery of the left and right side of the operator's peripheral vision. The horizontal compression of the peripheral view provides the operator queuing for situational awareness and sufficient imagery detail to maintain cognitive understanding to be able to identify the objects within the entire scene. See, for example FIG. 2, where telephone poles 18 are skinny, but still look like telephone poles.

One embodiment of the system is wherein a pilot can now have his peripheral vision compressed and presented by a narrow field of view vision system (e.g., about 50° FOV) while maintaining a 30° FOV binocular with high acuity. In some cases, using a 4:1 compression on the periphery, the 50° viewer can provide 40° left+30° binocular+40° right conveying a total of 110° FOV to the pilot. In some cases one or more displays 27, 28 are used to convey the information to the pilot or operator.

Figure 4A:
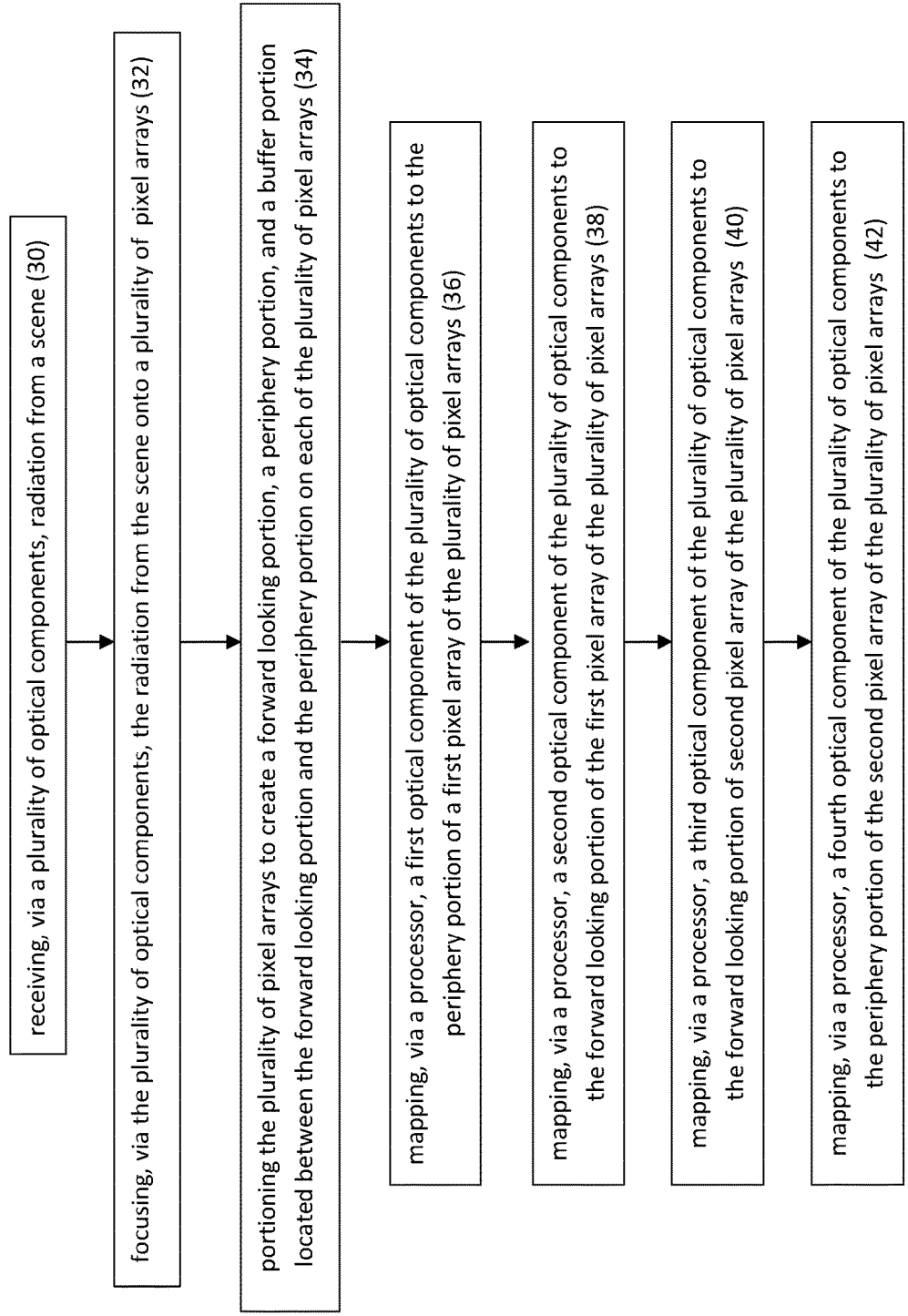
FIG. 4A and FIG. 4B show a flowchart of one embodiment of the method of the present disclosure.

Referring to FIG. 4A, a flowchart of one embodiment of the method of the present disclosure is shown. More specifically, the system receives, via a plurality of optical components, radiation from a scene 30. Using the plurality of optical components, the radiation from the scene is focused onto a plurality of pixel arrays 32. The plurality of pixel arrays are portioned to create a forward looking portion, a periphery portion, and a minimal buffer portion located between the forward looking portion and the periphery portion on each of the plurality of pixel arrays 34. A processor maps a first optical component of the plurality of optical components to the periphery portion of a first pixel array of the plurality of pixel arrays 36; a second optical component of the plurality of optical components to the forward looking portion of the first pixel array of the plurality of pixel arrays 38; a third optical component of the plurality of optical components to the forward looking portion of a second pixel array of the plurality of pixel arrays 40; and a fourth optical component of the plurality of optical components to the periphery portion of the second pixel array of the plurality of pixel arrays 42.

Figure 4B:
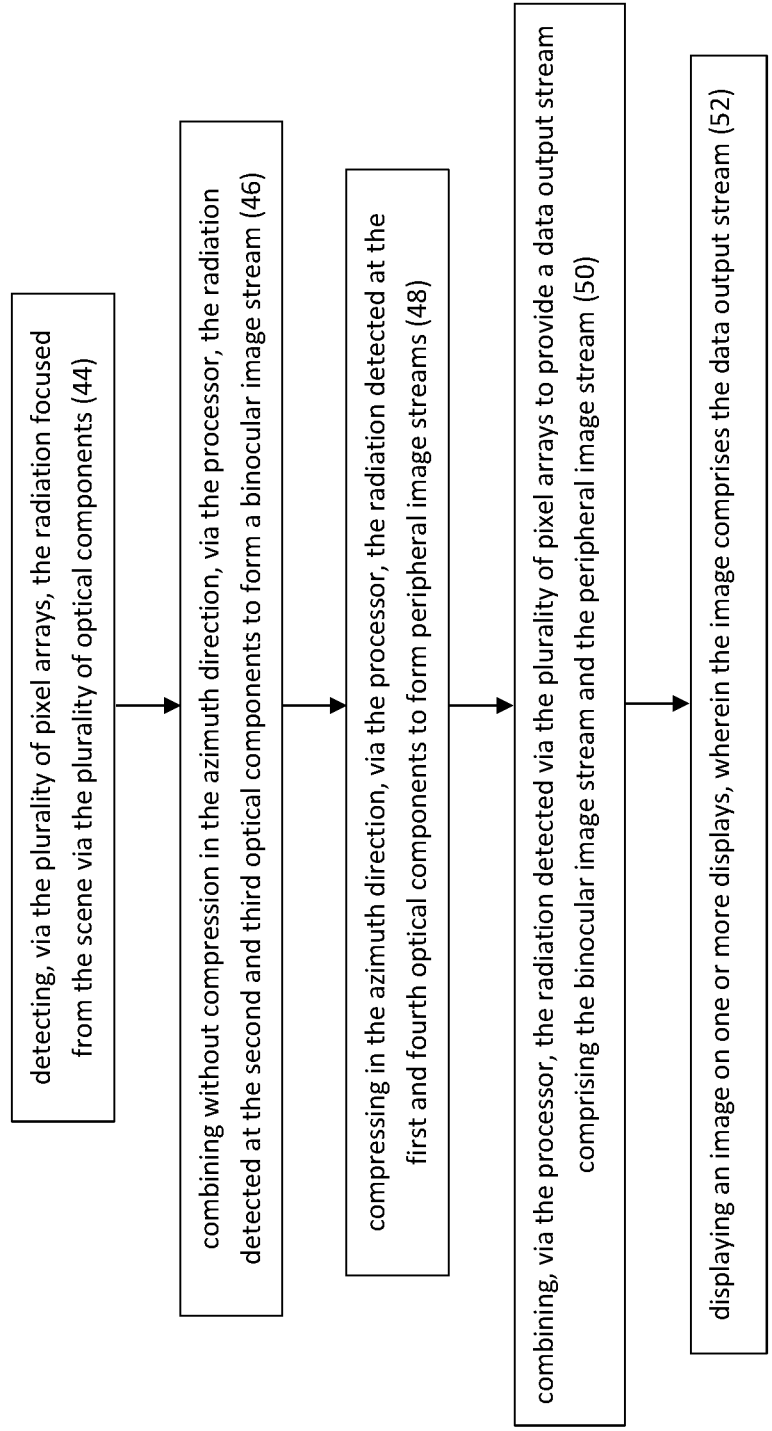

Referring to FIG. 4B, the plurality of pixel arrays detect the radiation focused from the scene via the plurality of optical components 44. The processor combines without compression in the azimuth direction the radiation detected at the second and third optical components to form a binocular image stream 46 and compresses in the azimuth direction the radiation detected at the first and fourth optical components to form peripheral image streams 48. The processor combines the radiation detected via the plurality of pixel arrays to provide a data output stream comprising the binocular image stream and the peripheral image streams 50 separated by a minimal buffer portion. The data output stream is then displayed on one or more displays as an image 52.

It is to be understood that the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A binocular vision system comprising
a first optical component and a second optical component;
a first sensor comprising a pixel array having at least two portions, where a first portion of the first sensor pixel array is mapped to the first optical component that is configured to focus radiation from a scene for a first peripheral view of the scene and a second portion of the first sensor pixel array is mapped to the second optical component that is configured to focus radiation from the scene for a first forward looking view of the scene, such that the first portion and the second portion of the first sensor pixel array are separated by a first buffer portion;
a third optical component and a fourth optical component;
a second sensor comprising a pixel array having at least two portions, where a first portion of the second sensor pixel array is mapped to the third optical component that is configured to focus radiation from the scene for a second forward looking view of the scene and a second portion of the second sensor pixel array is mapped to the fourth optical component that is configured to focus radiation from the scene for a second peripheral view of the scene, such that the first portion and the second portion of the second sensor pixel array are separated by a second buffer portion; and
a processor configured to portion the first and second sensor pixel arrays, processes the radiation detected by the first and second sensor pixel arrays, and forms an image displayed on a display such that the first and second periphery of the image results from the first and fourth optical components and the first and second forward looking views of the image results from the second and third optical components.

2. The binocular vision system of claim 1, wherein the first and the fourth optical components produce horizontal compression.

3. The binocular vision system of claim 2, wherein the compression is about 3:1 in an azimuth direction.

4. The binocular vision system of claim 2, wherein the compression is about 4:1 in an azimuth direction.

5. The binocular vision system of claim 1, wherein a total field of view of the image displayed is about 110 degrees.

6. The binocular vision system of claim 1, wherein the pixel array is about 1600 pixels wide and at least one of the first or second periphery is about 450 pixels wide, at least one of the first or second forward looking direction is about 1100 pixels wide and at least one of the first or second buffer portion is about 50 pixels wide.

7. The binocular vision system of claim 1, wherein the radiation comprises visible, near infrared, short-wave infrared, mid-wave infrared, and/or long-wave infrared.

8. A method of providing binocular vision comprising,
receiving, via a plurality of optical components, radiation from a scene;
focusing, via the plurality of optical components, the radiation from the scene onto a plurality of pixel arrays;
portioning the plurality of pixel arrays to create a forward looking portion, a periphery portion, and a buffer portion located between the forward looking portion and the periphery portion on each of the plurality of pixel arrays;
mapping, via a processor, a first optical component of the plurality of optical components to the periphery portion of a first pixel array of the plurality of pixel arrays;
mapping, via a processor, a second optical component of the plurality of optical components to the forward looking portion of the first pixel array of the plurality of pixel arrays;
mapping, via a processor, a third optical component of the plurality of optical components to the forward looking portion of a second pixel array of the plurality of pixel arrays;
mapping, via a processor, a fourth optical component of the plurality of optical components to the periphery portion of the second pixel array of the plurality of pixel arrays;
detecting, via the plurality of pixel arrays, the radiation focused from the scene via the plurality of optical components;
combining without compression in the azimuth direction, via the processor, the radiation detected at the second and third optical components to form a binocular image stream;
compressing in the azimuth direction, via the processor, the radiation detected at the first and fourth optical components to form peripheral image streams;
combining, via the processor, the radiation detected via the plurality of pixel arrays to provide a data output stream comprising the binocular image stream and the peripheral image streams; and
displaying an image on one or more displays, wherein the image comprises the data output stream.

9. The method of providing binocular vision of claim 8, wherein the first and the fourth optical components produce horizontal compression.

10. The method of providing binocular vision of claim 9, wherein the compression is about 3:1 in an azimuth direction.

11. The method of providing binocular vision of claim 9, wherein the compression is about 4:1 in an azimuth direction.

12. The method of providing binocular vision of claim 8, wherein a total field of view of the displayed image is about 110 degrees.

13. The method of providing binocular vision of claim 8, wherein the pixel array is about 1600 pixels wide and the periphery portion is about 450 pixels wide, the forward looking portion is about 1100 pixels wide and the buffer portion is about 50 pixels wide.

14. The method of providing binocular vision of claim 8, wherein the radiation comprises visible, near infrared, short-wave infrared, mid-wave infrared, and/or long-wave infrared.

* * * * *